US012769030B2

(12) United States Patent
Katz et al.

(10) Patent No.: US 12,769,030 B2
(45) Date of Patent: Oct. 20, 2026

(54) METHOD AND SYSTEM FOR DYNAMIC GENERATION OF HIGH-RESOLUTION CLIMATE PROJECTIONS

(71) Applicant: S&P Global Inc., New York, NY (US)

(72) Inventors: Yuri Katz, New York, NY (US); Saurabh Paul, New York, NY (US); Alka Dagar, Gurgaon (IN); Shruti Iyyer, Gurgaon (IN); Gaurav Singh, Gurgaon (IN); Grzegorz Chlodzinski, London (GB); Kun Liu, London (GB)

(73) Assignee: S&P Global, Inc., New York, NY (US)

( * ) Notice: Subject to any disclaimer, the term of this patent is extended or adjusted under 35 U.S.C. 154(b) by 452 days.

(21) Appl. No.: 18/461,967

(22) Filed: Sep. 6, 2023

(65) Prior Publication Data

US 2025/0076537 A1 Mar. 6, 2025

(51) Int. Cl.
*G01W 1/10* (2006.01)
*G06N 3/0464* (2023.01)

(52) U.S. Cl.
CPC ............ *G01W 1/10* (2013.01); *G06N 3/0464* (2023.01); *G01W 2201/00* (2013.01)

(58) Field of Classification Search
CPC .. G01W 1/10; G01W 2201/00; G06N 3/0464; G06N 3/045
See application file for complete search history.

(56) References Cited

U.S. PATENT DOCUMENTS

2023/0143145 A1* 5/2023 Price ...................... G06N 3/047 706/21
2023/0152487 A1* 5/2023 Erinjippurath ......... G06N 20/00 702/3
2024/0054267 A1* 2/2024 Qvist ...................... G06F 30/27

FOREIGN PATENT DOCUMENTS

CN 113792480 A * 12/2021 ....... G06F 18/23213

OTHER PUBLICATIONS

B. Park et al. "Delineation of high resolution climate regions over the Korean Peninsula using machine learning approaches", PLoS One. Oct. 10, 2019;14. (Year: 2019).*
Ballard et al., "Contrastive Learning for Climate Model Bias Correction and Super-Resolution," Association for the Advancement of Artificial Intelligence (www.aaai.org), Nov. 10, 2022, 6 pages, Sust Global, San Francisco, CA, accessed Aug. 23, 2023, https://arxiv.org/pdf/2211.07555.pdf.

(Continued)

*Primary Examiner* — Eman A Alkafawi
*Assistant Examiner* — Dilara Sultana
(74) *Attorney, Agent, or Firm* — Yee & Associates, P.C.

(57) ABSTRACT

Dynamic generation of climate projections is provided. The method comprises receiving past climate data of a first spatial resolution. The past climate data of the first spatial resolution is converted to past climate data of a second spatial resolution. A machine learning model is trained with a deep learning algorithm with a training set of the data to generate a trained model object that maps a relationship between the past climate data of the first spatial resolution and the first climate data of the second spatial resolution. The trained model object is validated with a validation set of the data. The trained model object is applied to climate projections of the second spatial resolution to generate climate projections of the first spatial resolution.

21 Claims, 13 Drawing Sheets

(56) References Cited

OTHER PUBLICATIONS

Ballard et al., "FireSRnet: Geoscience-Driven Super-Resolution of Future Fire Risk from Climate Change," 9 pages, NeurIPS 2020, accessed Aug. 23, 2023, https://s3.us-east-1.amazonaws.com/climate-change-ai/papers/neurips2020/45/paper.pdf.

Vandal, et al., "DeepSD: Generating High Resolution Climate Change Projections through Single Image Super-Resolution," KDD 2017 Applied Data Science Paper, Aug. 13-17, pp. 1663-1672, KDD'17, Halifax, NS, Canada, accessed Aug. 23, 2023, https://dl.acm.org/doi/pdf/10.1145/3097983.3098004.

* cited by examiner

| | | | | | | | | | | |
|---|---|---|---|---|---|---|---|---|---|---|
| 1.6 | 2.1 | -0.49 | 1.7 | 3.9 | 3 | 4.7 | 5.2 | 5 | 3.9 | 3.4 |
| 1 | 8.2 | 0.091 | 5 | 2.3 | 3.8 | 5.5 | 5.2 | 4.9 | 4 | 3.5 |
| -4.2 | 2.1 | 2.9 | 5.4 | 7 | 5.8 | 5.3 | 7 | 5.9 | 4.1 | 5.4 |
| 0.26 | -0.63 | 5.6 | 7.9 | 5.6 | 7.5 | 6.2 | 6.9 | 7.4 | 6.3 | 6.4 |
| -0.75 | -4.1 | 6.8 | 5.6 | 7 | 7.2 | 13 | 11 | 9.1 | 9.2 | 8 |
| 0.01 | -0.75 | 2.1 | 7.1 | 5.6 | 8.7 | 5.1 | 13 | 7.9 | 10 | 8.9 |
| 4.5 | 3.2 | 2.5 | 6.9 | 4.5 | 8.9 | 4.7 | 13 | 7.3 | 9.4 | 9.4 |
| 5.9 | 4.2 | 4.7 | 8.9 | 8.1 | 8.8 | 8.5 | 11 | 12 | 11 | 11 |
| 7.4 | 8.5 | 7.7 | 5.8 | 11 | 12 | 10 | 9.2 | 11 | 12 | 13 |
| 8.9 | 8.7 | 5.9 | 11 | 9.8 | 10 | 9.3 | 9.3 | 9.5 | 10 | 13 |
| 7.7 | 6.8 | 10 | 11 | 11 | 11 | 10 | 10 | 11 | 12 | 13 |

| | | | | | | | | | | |
|---|---|---|---|---|---|---|---|---|---|---|
| 1.6 | 2.1 | -0.49 | 1.7 | 3.9 | 3 | 4.7 | 5.2 | 5 | 3.9 | 3.4 |
| 1 | 8.2 | 0.091 | 5 | 2.3 | 3.8 | 5.5 | 5.2 | 4.9 | 4 | 3.5 |
| -4.2 | 2.1 | 2.9 | 5.4 | 7 | 5.8 | 5.3 | 7 | 5.9 | 4.1 | 5.4 |
| 0.26 | -0.63 | 5.6 | 7.9 | 5.6 | 7.5 | 6.2 | 6.9 | 7.4 | 6.3 | 6.4 |
| -0.75 | -4.1 | 6.8 | 5.6 | 7 | 7.2 | 13 | 11 | 9.1 | 9.2 | 8 |
| 0.01 | -0.75 | 2.1 | 7.1 | 5.6 | 8.7 | 5.1 | 13 | 7.9 | 10 | 8.9 |
| 4.5 | 3.2 | 2.5 | 6.9 | 4.5 | 8.9 | 4.7 | 13 | 7.3 | 9.4 | 9.4 |
| 5.9 | 4.2 | 4.7 | 8.9 | 8.1 | 8.8 | 8.5 | 11 | 12 | 11 | 11 |
| 7.4 | 8.5 | 7.7 | 5.8 | 11 | 12 | 10 | 9.2 | 11 | 12 | 13 |
| 8.9 | 8.7 | 5.9 | 11 | 9.8 | 10 | 9.3 | 9.3 | 9.5 | 10 | 13 |
| 7.7 | 6.8 | 10 | 11 | 11 | 11 | 10 | 10 | 11 | 12 | 13 |

FUTURE

1220

1224

METHOD AND SYSTEM FOR DYNAMIC GENERATION OF HIGH-RESOLUTION CLIMATE PROJECTIONS

BACKGROUND INFORMATION

1. Field

The present disclosure relates generally to climate projections, and more specifically to a method and system for dynamic generation of high-resolution climate projections.

2. Background

Accurate climate projection is important because climate change is one of the challenges facing our planet today. As global temperatures rise and weather patterns become erratic due to climate change, the need for accurate climate projections has become paramount. Such projections are vital for various sectors, including agriculture, infrastructure planning, disaster management, and policymaking, to effectively mitigate the risks associated with climate change.

General Circulation Models (GCMs), which are part of the Coupled Model Intercomparison Project (CMIP), are the foundational basis for simulating climate change projections up to the turn of the century and provide climate projections at a global scale. However, the major limitation of the GCM-based climate projections is a low geospatial resolution of the output, which ranges from 100 km to 250 km. This complicates estimations of the local-scale exposure of asset-level physical risk and forward-looking financial impact analysis. To address this limitation, NASA Earth Exchange (NEX) Global Daily Downscaled Projections (GDDP) provide climate projections at 25 km resolution by enhancing coarse-grained GCM projections up to the end of the century using traditional statistical downscaling techniques. While this approach provides useful insights at a global or regional level, it fails to provide a higher geospatial resolution needed for applications in agriculture, infrastructure planning, disaster management and risk management.

SUMMARY

An illustrative embodiment provides a computer-implemented method for dynamic generation of climate projections. The method comprises receiving past climate data of a first spatial resolution. The past climate data includes a plurality of climatological variables. The past climate data of the first spatial resolution is converted to past climate data of a second spatial resolution. A first subset of the past climate data of the first spatial resolution and corresponding past climate data of the second spatial resolution is allocated to a training set of pairs of the past climate data of the first and second spatial resolutions. A second subset of remaining pairs of past climate data of the first spatial resolution and the corresponding past climate data of the second spatial resolution is allocated to a validation set. The method trains a machine learning model with a deep learning algorithm with the training set to generate a trained model object that maps a relationship between the past climate data of the first spatial resolution and the first climate data of the second spatial resolution. The trained model object is then validated with the validation set.

In another illustrative embodiment, the method comprises receiving climate projections of the second spatial resolution and applying the trained model object to the climate projections of the second spatial resolution to generate climate projections of the first spatial resolution. The first spatial resolution is higher than the second spatial resolution.

In another illustrative embodiment, the method comprises pre-processing the past climate data of the first spatial resolution and the past climate data of the second spatial resolution prior to training the machine learning model. The pre-processing comprises at least one of normalizing, augmenting, or enhancing the past climate data of the first and second resolutions prior to training the machine learning model.

Another illustrative embodiment provides a system for dynamic generation climate projections. The system comprises a storage device configured to store program instructions and one or more processors operably connected to the storage device and configured to execute the program instructions to cause the system to: receive past climate data of a first spatial resolution, wherein the past climate data comprises a plurality of climatological variables; convert the past climate data of the first spatial resolution to past climate data of a second spatial resolution; allocate a first subset of the past climate data of the first spatial resolution and corresponding past climate data of the second spatial resolution to a training set of pairs of the past climate data of the first and second spatial resolutions; allocate a second subset of remaining past climate data of the first spatial resolution and corresponding past climate data of the second spatial resolution to a validation set of pairs of the past climate data of the first and second spatial resolutions; train a machine learning model with a deep learning algorithm with the training set of pairs of the past climate data of the first and second spatial resolutions to generate a trained model object that maps a relationship between the past climate data of the first spatial resolution and the first climate data of the second spatial resolution; and validate the training model with the validation set of pairs of the past climate data of the first and second spatial resolutions.

Another illustrative embodiment provides a computer program product for dynamic generation of climate projections. The computer program product comprises a computer readable storage medium having program instructions embodied thereon to perform the steps of: receiving past climate data of a first spatial resolution comprising a plurality of climatological variables; converting the past climate data of the first spatial resolution to past climate data of a second spatial resolution; allocating a first subset of the past climate data of the first spatial resolution and corresponding past climate data of the second spatial resolution to a training set of pairs of the past climate data of the first and second spatial resolutions; allocating a second subset of remaining pairs of past climate data of the first spatial resolution and the corresponding past climate data of the second spatial resolution to a validation set; training a machine learning model with a deep learning algorithm with the training set of pairs of the past climate data of the first and second resolutions to generate a trained model object that maps a relationship between the past climate data of the first spatial resolution and the first climate data of the second spatial resolution; and validating the trained model object using the validation set of pairs of the past climate data of the first and second spatial resolutions.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that the need for accurate climate projections has become paramount. Such projections are vital for various sectors, including agriculture, infrastructure planning, disaster management, and policymaking, to effectively mitigate the risks associated with climate change.

The illustrative embodiments also recognize and take into account that current climate projection models suffer from a drawback: their low spatial resolution. Traditional climate projection models typically operate at coarse spatial scales, often ranging from tens to hundreds of kilometers. While these models provide some insights at a global or regional level, they fail to provide details of climate changes occurring at smaller scales, such as local weather patterns and microclimates.

The illustrative embodiments provide a method and system for dynamic generation of high-resolution climate projections. In the present disclosure, the term "climate projections" generally refers to climate projection data and/or climate projection maps. The illustrative embodiments address the limitations associated with current climate projections, particularly their low resolution, in order to provide more accurate and reliable information on climate change.

In some illustrative embodiments, a machine learning model is trained using a deep learning algorithm with a training set of past climatological data of a first resolution (e.g., high resolution) and past climatological data of a second resolution (e.g., low resolution). Once the training process is completed, the resulting optimized parameters form a trained model object. The trained model object represents a mapping function which is capable of making accurate predictions or decisions on new or unseen data. In the illustrative embodiments, the trained model object is a mapping function that maps a relationship between the past climatological data of the second resolution and the past climatological data of the first resolution. The trained model object is validated using a validation set of past climatological data of the first and second resolutions. Finally, the trained model object is applied to climate projections of the second resolution. The training model object enhances the climate projections of the second resolution to generate the climate projections of the first resolution.

Figure 1:
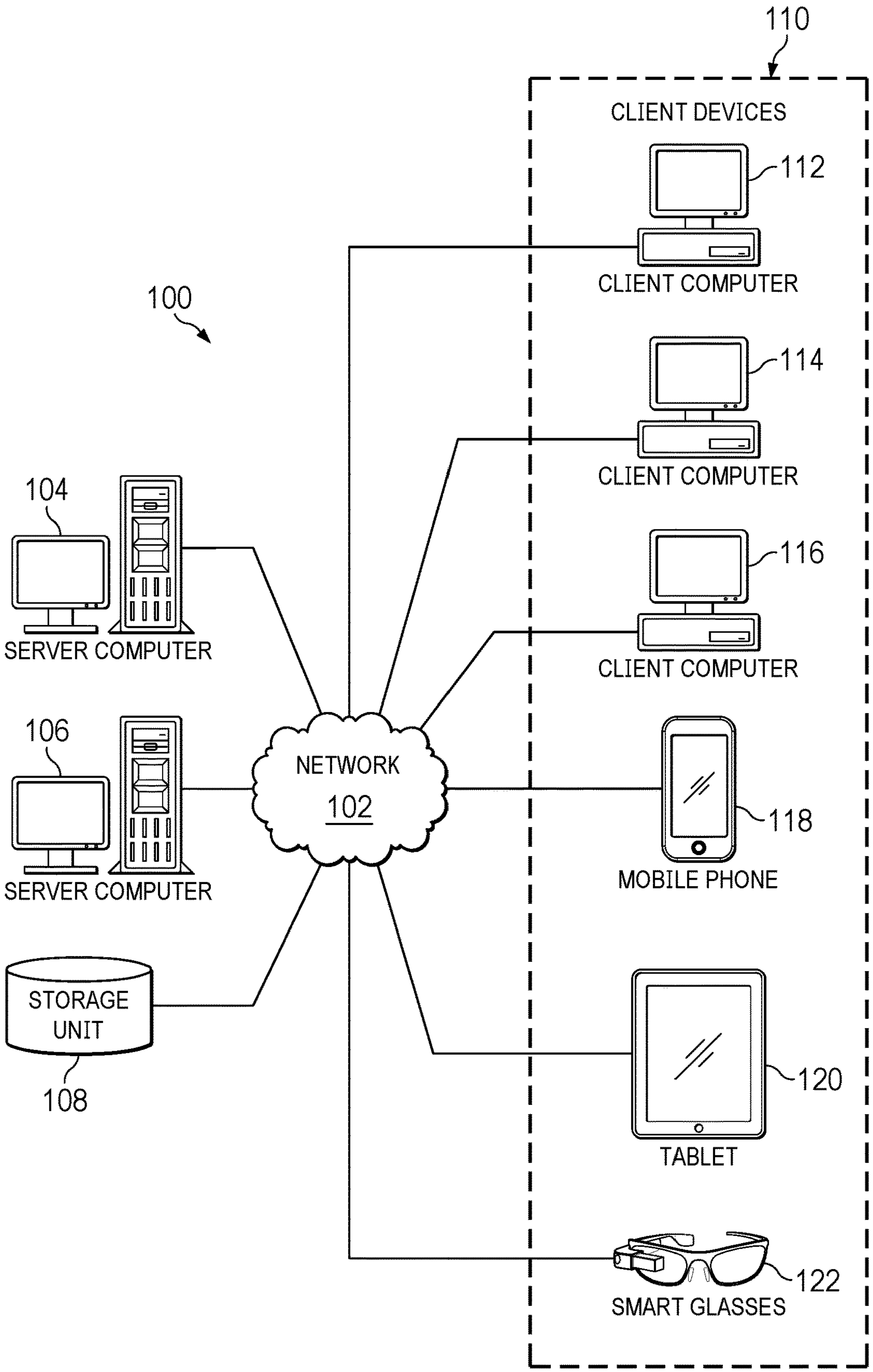
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected within network data processing system 100. Network 102 may include connections, such as wire, wireless communication links, or fiber optic cables.

In the depicted example, server computers 104 and 106 and storage unit 108 connect to network 102. In addition, client devices 110 connect to network 102. In the depicted example, server computers 104 and 106 provide information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet 120, and smart glasses 122.

In the illustrative example of FIG. 1, server computers 104 and 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Program code located in network data processing system 100 can be stored on a computer-recordable storage medium and downloaded to a data processing system or other device for use. For example, the program code can be stored on a computer-recordable storage medium on server computers 104 and 106 and storage unit 108 and downloaded to client devices 110 over network 102 for use on client devices 110.

In the illustrative example of FIG. 1, network 102 can be the internet representing a worldwide collection of networks and gateways that use the Transmission Control Protocol/Internet Protocol (TCP/IP) suite of protocols to communicate with one another. At the heart of the internet is a backbone of high-speed data communication lines between major nodes or host computers consisting of thousands of commercial, governmental, educational, and other computer systems that route data and messages. Of course, network data processing system 100 also may be implemented using different types of networks. For example, network 102 can be comprised of an intranet, a local area network (LAN), a metropolitan area network (MAN), or a wide area network (WAN). FIG. 1 is intended as an example, and not as an architectural limitation for the different illustrative embodiments.

Figure 2:
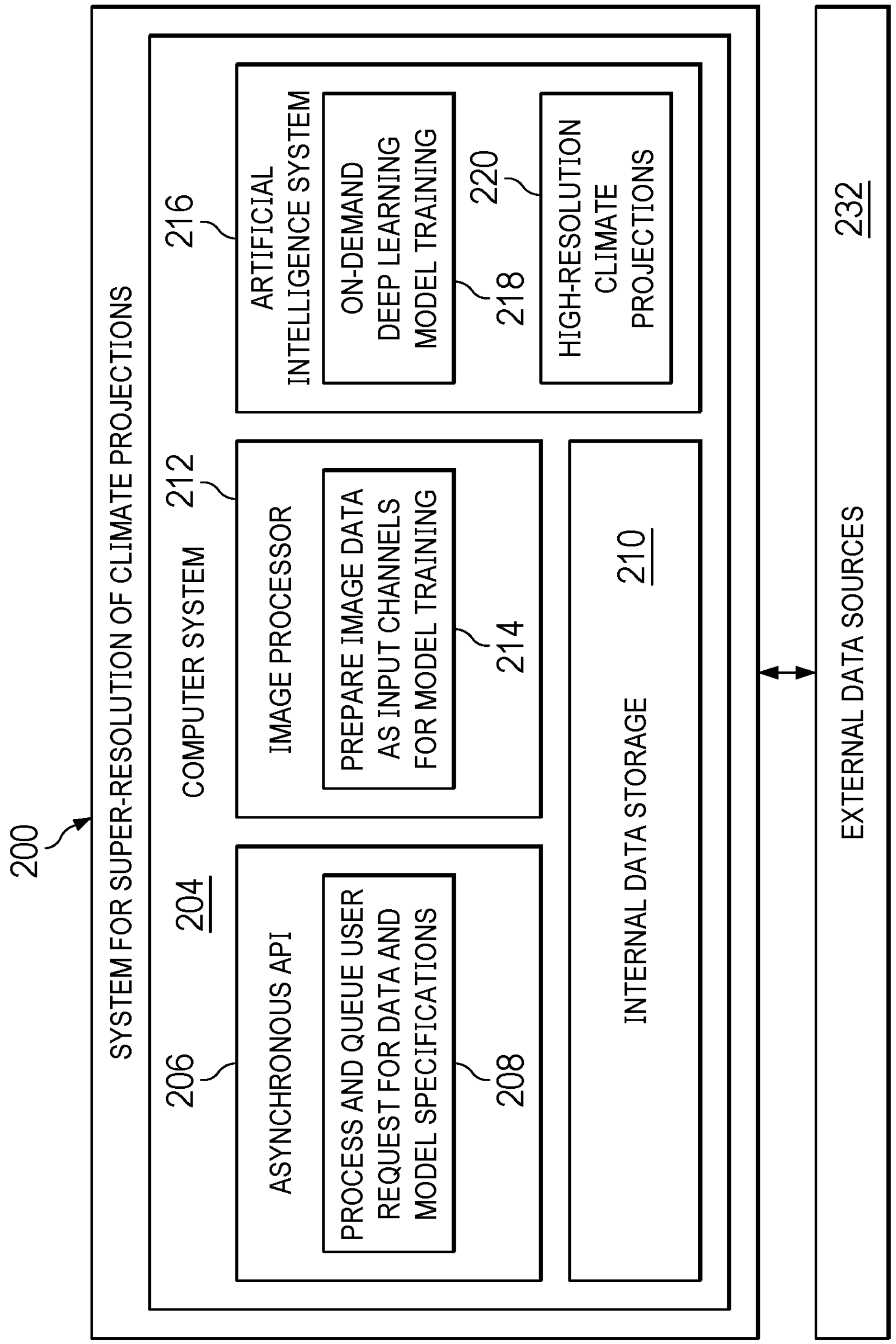
FIG. 2 is a block diagram of a system for a dynamic generation of climate projections.

FIG. 2 is a block diagram of system 200 for a dynamic generation of climate projections of a first resolution (e.g., high resolution) from climate projections of a second resolution (e.g., low resolution) in accordance with an illustrative embodiment. The climate projections may include climatological maps and/or climatological data.

System 200 comprises computer system 204. Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

Computer system 204 includes application programming interface (API) 206. The API includes a set of definitions and protocols for building and integrating application software and allowing various programs to query and exchange data. In some example embodiments, API 206 may be an asynchronous REST (Representational State Transfer) interface which maintains and services a queue of user requests. API 206 queues and processes user inputs entered by a client (not illustrated in FIG. 2) using a personal computer, a laptop computer, a mobile computing device or any other client-facing interface device. The user input can accommodate multiple aspects such as but not limited to geo-location of interest, climate hazards, climatological variables, CMIP scenarios of climate change, GCM models of interest and time horizon for climate projections.

Based on user inputs processed by API 206, processing unit 208 retrieves satellite and climatological images and data from external data sources 232. The climatological images and data from external data sources are also referred to as past climatological data of the first spatial resolution (e.g., high resolution). The past climatological data of the first spatial resolution may comprise historical or observed climatological images and data which may have been previously acquired by satellites or other external sources. In some example embodiments, the first spatial resolution is around 1 km.

External data sources 232 may include multiple sources of geo-spatial data, such as, but not limited to, NASA, ESA, National Center for Atmospheric Research, US National Geophysical Data Center, providing historical time-series of satellite images on climate hazards, images of climate projections either directly produced by GCMs or downscaled versions such as NEX GDDP projections depending on climate hazard or climatological variable, as well as multiple additional informative data elements, such as but not limited to elevation and land burnability per geo-location. Data retrieval from these external sources may involve using APIs with associated authentication methods, such as the NASA MODIS API & Google Earth Engine service API, web scrapping, batch-download data from external servers such as MODIS S3 buckets, file transfer protocols, or other data retrieval methods, both from public data sources as well as paid vendors.

In some illustrative examples, computer system 204 in advance and independent of user query, may retrieve required data elements in available resolutions at a global scale and across relevant climatological variables, GCM models and CMIP scenarios from respective data providers and store them in internal data storage 210 (e.g., hard drive, database, cloud storage). Based on user input, API 206 may then filter and retrieve a subset of data elements specific to user query from internal data storage 210.

In some illustrative examples, instead of prior data retrieval which may have a large data footprint, computer system 204 may dynamically retrieve only required data elements from multiple data providers from external data sources 232 based on a specific set of user requests as processed by API 206.

Data retrieved from external data sources 232 are stored in internal data storage 210 for persistent and faster access. Internal data storage 210 may include an internal database, such as, but not limited to PostGIS, cloud data storage, such as but not limited to Amazon S3, or other internal data storage for persistent storage and faster access.

Computer system 204 includes image processor 212 configured to pre-process the past climatological data of the first resolution retrieved from internal data storage 210. The past climatological data of the first spatial resolution may, for example, include raw data elements such as satellite data, satellite images and additional informative data elements, such as elevation. Image processor 212 generates past climatological data of the second spatial resolution based on the past climatological data of the first spatial resolution. The past climatological data of the second spatial resolution may be generated by, for example, converting or transforming the past climatological data of the first spatial resolution by interpolating and resampling the data. Thus, low-resolution data (e.g., past climatological data of the second spatial resolution) is generated from high-resolution data (e.g., past climatological data of the first spatial resolution) by interpolating and resampling the high-resolution data. In some example embodiments, the first spatial resolution is around 1 km, and the second spatial resolution is around 25 km. Image processor 212 prepares a set of training and validation data 214 in the form of pairs of the past climatological data of the first spatial resolution and the past climatological data of the second spatial resolution for deep learning models.

In some example embodiments, multiple image processing routines may be implemented in image processor 212. Image processor 212 may prepare the set of training and validation data 214 as input channels for training a machine learning model. In some example embodiments, a machine learning model is trained using a deep learning algorithm.

Computer system 204 includes artificial intelligence (AI) system 216. Machine learning component 218 may be implemented as a part of AI system 216. In some example embodiments, machine learning component 218 is configured to train on-demand a deep learning computer vision algorithm in the domain of image super-resolution to learn a trained model object which represents a mapping function from the past climatological data of the second spatial resolution to the past climatological data of the first spatial resolution. Thus, the deep learning computer algorithm is trained to learn a mapping function from the low-resolution data to the high-resolution data.

Deep learning is a machine learning method that focuses on training artificial neural networks to learn and make predictions or decisions based on input data. It may involve training an algorithm or model, allowing it to automatically learn hierarchical representations of the data. The deep learning algorithm may comprise convolutional neural networks (CNN) as building blocks, a type of neural network architecture particularly suited for image data.

In some example embodiments, the mapping function may incorporate learning from relevant additional observables, such as but not limited to elevation. These additional observables may be included as additional channels into the deep-learning algorithm.

In some example embodiments, the deep learning algorithm may utilize deep residual networks wherein blocks of CNN modules are repeated with residual learning implemented as shortcut connections. The architecture may also use generative approaches, such as generative-adversarial networks and diffusion models.

Subsequently, the trained model object (e.g., mapping function) is applied on climate projections of the second spatial resolution (e.g., low resolution) to enhance the climate projections of the second spatial resolution and generate the climate projections of the first spatial resolution (e.g., high resolution). In some example embodiments, the first spatial resolution is around 1 km, and the second spatial resolution is around 25 km. The climate projections of the second spatial resolution may, for example, be provided by NEX GDDP.

In some example embodiments, depending on user provided geo-location and prior instances of model training, a pre-trained model object may also be used instead of an on-demand model training.

Computer system 204 can be configured to perform at least one of the steps, operations, or actions described in the different illustrative examples using software, hardware, firmware, or a combination thereof. In some example embodiments, AI system 216 combined with API 206 transforms computer system 204 into a special purpose computer system for on-demand deep-learning for enhancing climate projections. In this example, computer system 204 operates as a tool that can increase at least one of speed, accuracy, or usability of the system. In particular, this increase in performance of computer system 204 can be used for the generation of high-resolution climate projections 220. In one illustrative example, AI system 216 in conjunction with API 206 provides for high-resolution climate projections 220 for multiple climatological variables or hazards per GCM climate scenarios, geo-location and other attributes tailored to user inputs.

The illustration of system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
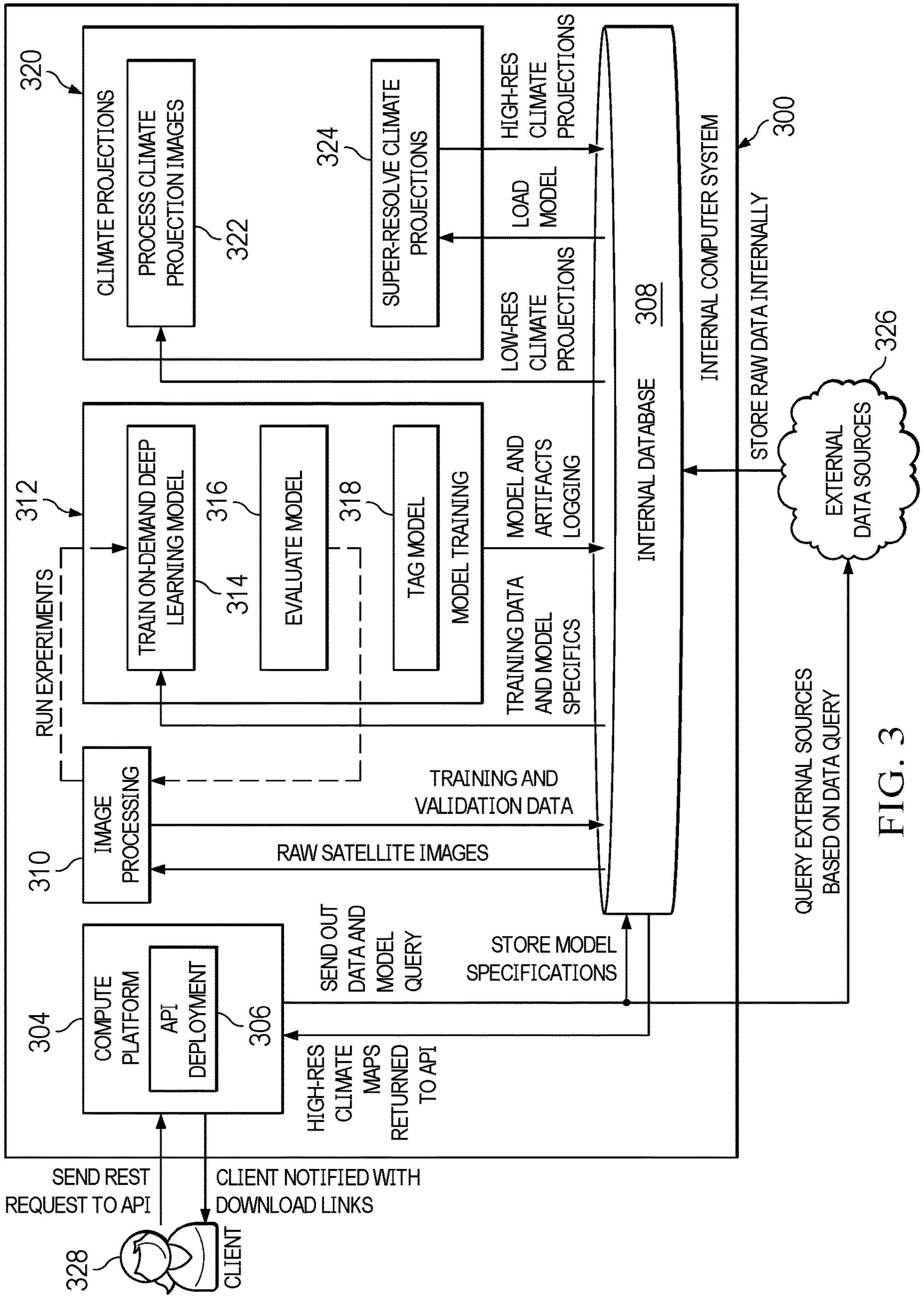
FIG. 3 is a block diagram of a computer for dynamically generating climate projections.

Turning now to FIG. 3, a block diagram of a computer system 300 for dynamically generating climate projections of the first spatial resolution (e.g., high resolution) from climate projections of the second spatial resolution (e.g., low resolution) is depicted in accordance with an illustrative embodiment. In this illustrative example, compute platform 304 comprises API 306, which can be implemented as API 206 in FIG. 2. In some example embodiments, API 306 implements the REST API framework, wherein user or client 328 sends in a REST request to API 306. The REST request, which may include climatological variables of interest, geo-location, CMIP scenarios, and other attributes, is queued and processed. After processing of the REST request, appropriate data queries are sent to multiple external data sources 326, such as but not limited to NASA and other external sources. Data is retrieved from external data sources 326 and stored in internal database 308. User specific requests pertaining to model implementations are also processed and saved in internal database 308.

System 300 comprises image processor 310 configured to read data (e.g., past climatological data of the first resolution) from internal database 308 and pre-process raw data elements, such as satellite data, satellite images and additional informative data elements, such as elevation. Image processor 310 generates past climatological data of the second spatial resolution based on the past climatological data of the first spatial resolution. The past climatological data of the second spatial resolution may be generated by, for example, converting or transforming the past climatological data of the first spatial resolution by interpolating and resampling the data. Thus, low-resolution data (e.g., 25 km) is generated from high-resolution data (e.g., 1 km) by interpolating and resampling the high-resolution data.

Image processor 310 prepares a set of training and validation data in the form of pairs of the past climatological data of the first resolution and the past climatological data of the second resolution for a deep learning model. Thus, the set of training and validation data comprise pairs of low-resolution data and/or images and high-resolution data and/or images. The training and validation data are stored in internal database 308.

System 300 comprises model training engine 312 which can be implemented as an artificial intelligence engine. Model training engine 312 is configured to retrieve the training data and the validation data from internal storage. Model training engine 312 trains deep learning model 314 using the training data. Model training engine 312 then validates deep learning model 314 (e.g., trained model object) based on validation metrics provided by evaluation model 316 and using the validation data retrieved from internal database 308. Based on the validation metrics from evaluation model 316, multiple training iterations may be implemented to train deep learning model 314 (e.g., trained model object) until desired accuracy. Finally, a trained model object and associated artifacts are tagged 318 and stored in internal database 308.

System 300 comprises climate projection system 320 configured to generate climate projections of the first spatial resolution (e.g., high resolution) from climate projections of the second spatial resolution using the trained model object. Climate projections include climate projection maps and/or climate projection data. Climate projection system 320 comprises processing module 322 which retrieves climate projections of the second spatial resolution (e.g., low resolution) from internal database 308 and processes the climate projections of the second spatial resolution. Climate projections of the second spatial resolution may include images for climate projections per user specified geo-location, CMIP climate scenarios and GCM models. Climate projection system 320 comprises projection module 324 which retrieves the trained model object from internal database 308 and utilizes the trained model object to generate the climate projections of the first spatial resolution (e.g., high resolution) from the climate projections of the second spatial resolution (e.g., low resolution). Climate projection system 320 may implement user provided specifications on trained model object, such as aggregation schemes across multiple GCM forecasts. The climate projections of the first spatial resolution are saved in internal database 308. Subsequently, data and images associated with climate projections of the first spatial resolution are returned to API 306 which may notify client 328 with appropriate download links.

Figure 4:
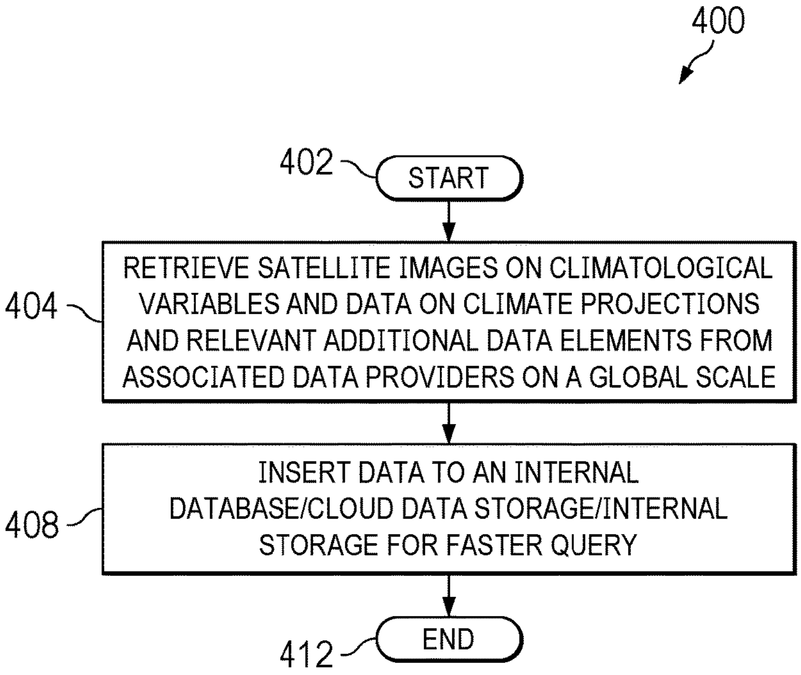
FIGS. 4 and 5 depict flowcharts illustrating processes for obtaining climatological and satellite data from external data sources.

With reference next to FIG. 4, a flowchart of process 400 for obtaining climatological and satellite data on a global scale from external data sources is depicted in accordance with an illustrative embodiment. Process begins at step 402, and in advance and independent of user specifications or queries, retrieves necessary data elements in available resolution at a global scale and across relevant climatological variables and CMIP scenarios from respective agencies or data providers (step 404). The retrieved data is stored in an internal storage (step 408) for persistent storage and faster query. The internal storage can, for example, comprise a hard drive, a database, or a cloud storage. Process 400 ends at step 412.

Figure 5:
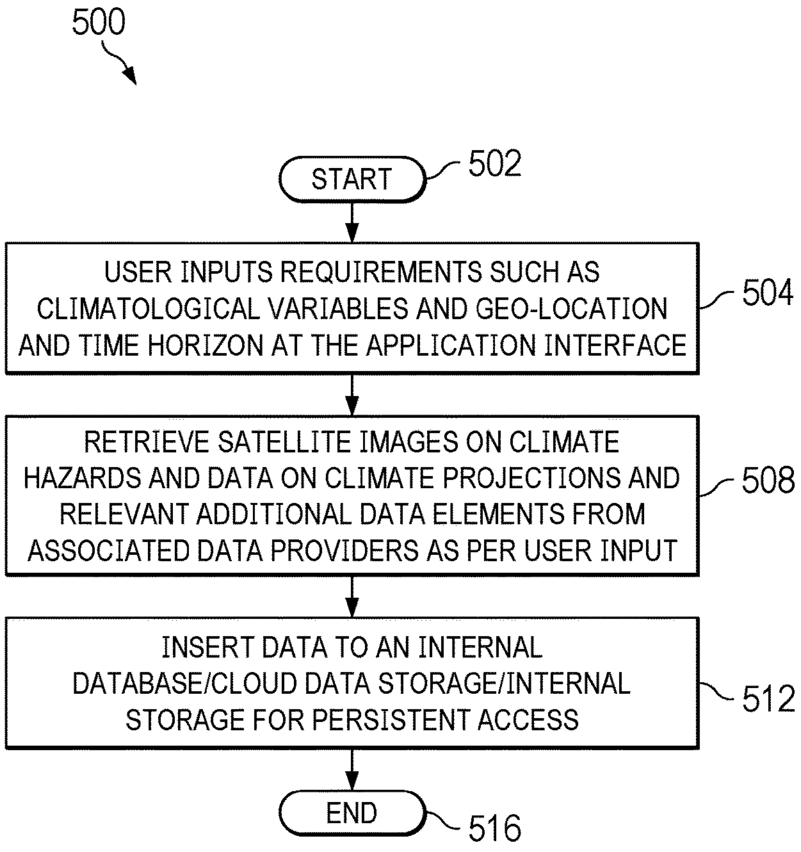

With reference to FIG. 5, a flowchart of process 500 for obtaining climatological and satellite data based on user specifications from external data sources is depicted in accordance with an illustrative embodiment. The process begins at step 502, and initially the user or client provides specific requirements to an API (step 504). The specific requirements may include, but are not limited to, climatological variables of interest, geo-location, time-horizon, and CMIP climate scenarios. In response to the specific requirements, appropriate data queries are sent to retrieve satellite data on climatological variables, climate projection maps and other relevant additional data elements (step 508). Retrieved data elements are not global or all-encompassing but aligned with user input. Subsequently, retrieved data is stored in an internal storage for persistent storage (step 512). Process 500 ends at step 516.

Figure 6:
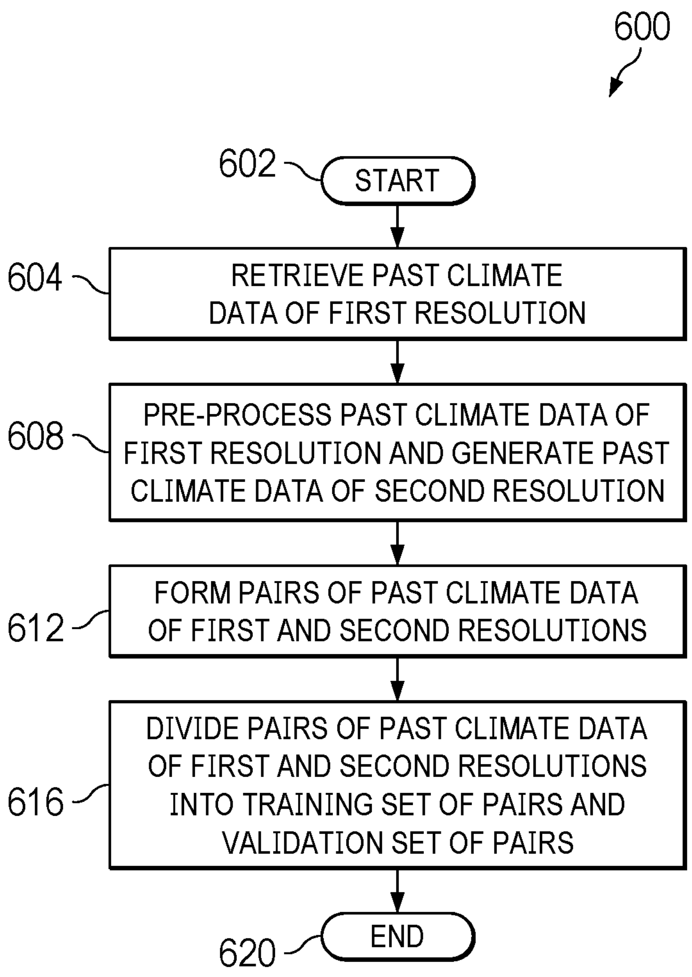
FIG. 6 depicts a flowchart of a process for generating training and validation data in accordance with an illustrative embodiment.

FIG. 6 depicts a flowchart of process 600 for generating training and validation data for on-demand model training in accordance with an illustrative embodiment. The process begins at step 602. Past observable climatological data of the first spatial resolution stored in an internal storage in process 400 and process 500 is retrieved from the internal storage (step 604). The past observable climatological data may comprise observed or historical data and/or images previously acquired by satellites or other sources. The first resolution is a high resolution (e.g., 1 km). The past climatological data may be retrieved by querying the internal storage (e.g., database) to filter and retrieve data elements required for model training per user specified criteria.

The past climatological data (e.g., past observable climatological data) of the first spatial resolution is pre-processed and utilized to generate past climatological data of the second spatial resolution (step 608). The second resolution is a low resolution (e.g., 25 km). In some example embodiments, the past climatological data of the first spatial resolution is pre-processed by combining tiled satellite images, masking satellite images and aggregating satellite images. The past climatological data of the second spatial resolution may be generated by, for example, converting or transforming the past climatological data of the first resolution by interpolating and resampling the data. Thus, low-resolution data (e.g., 25 km) is generated by interpolating and resampling high-resolution observable data (e.g., 1 km).

Next, pairs of past climatological data of the first and second resolutions are formed for on-demand model training (step 612). Each pair comprises data of the first resolution and corresponding data of the second resolution based on user specifications. The pairs of past climatological data of the first and second resolutions are divided or segregated into a training set of pairs and a validation set of pairs (step 616). For example, if there are a total of 100 pairs of past climatological data of the first and second resolutions, 70 pairs may be allocated to the training set and the remaining 30 pairs may be allocated to the validation set. Process 600 then ends at step 620.

Figure 7:
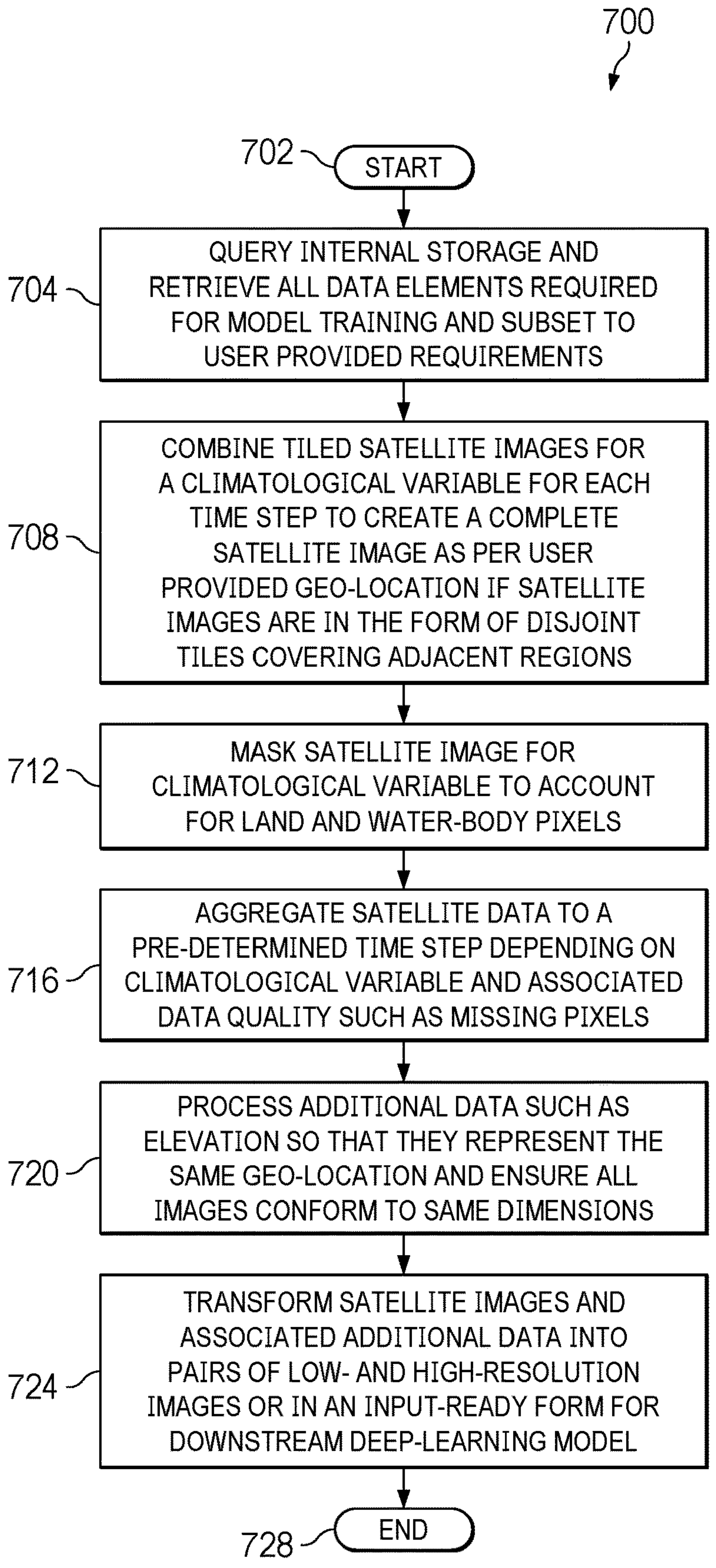
FIG. 7 depicts a detailed flowchart of a process for generating training and validation data in accordance with an illustrative embodiment.

FIG. 7 depicts a detailed flowchart of process 700 for generating training and validation data produced in process 600 for on-demand model training in accordance with another illustrative embodiment. Process 700 begins at step 702. An internal database is queried to filter and retrieve data elements required for model training per user specified criteria (step 704). The data elements are of the first resolution (e.g., high resolution), and the data elements may include satellite images relating to climate variables, such as, but not limited to, from MODIS (NASA), which may be in the form of tiles covering non-overlapping geographical segments. Multiple tiles are stitched appropriately to reproduce the required user specified geo-location (step 708). Additional image processing steps, such as masking water bodies from land pixels are performed (step 712) and aggregating data to a pre-determined time step, such as weekly or monthly, are performed (step 716). Additional image processing steps may ameliorate the problem of pixels with no data, such as that caused by cloud cover. In some example embodiments, additional data elements associated with the same geo-location, such as but not limited to elevation, provide additional information on topography, and are incorporated as input channels (step 720). Finally, training-ready processed data (produced in process 600), which may comprise of pairs of low- and high-resolution images are created for on-demand model training (step 724) and saved in an internal storage or database. The process of creation of low-resolution images for model training purposes may involve application of interpolation and resampling techniques on associated high-resolution images. In some example embodiments, further pre-processing may be performed such as, for example, normalizing, augmenting, or enhancing the low- and high-resolution images prior to training a machine learning model. Process 700 ends at step 728.

Figure 8:
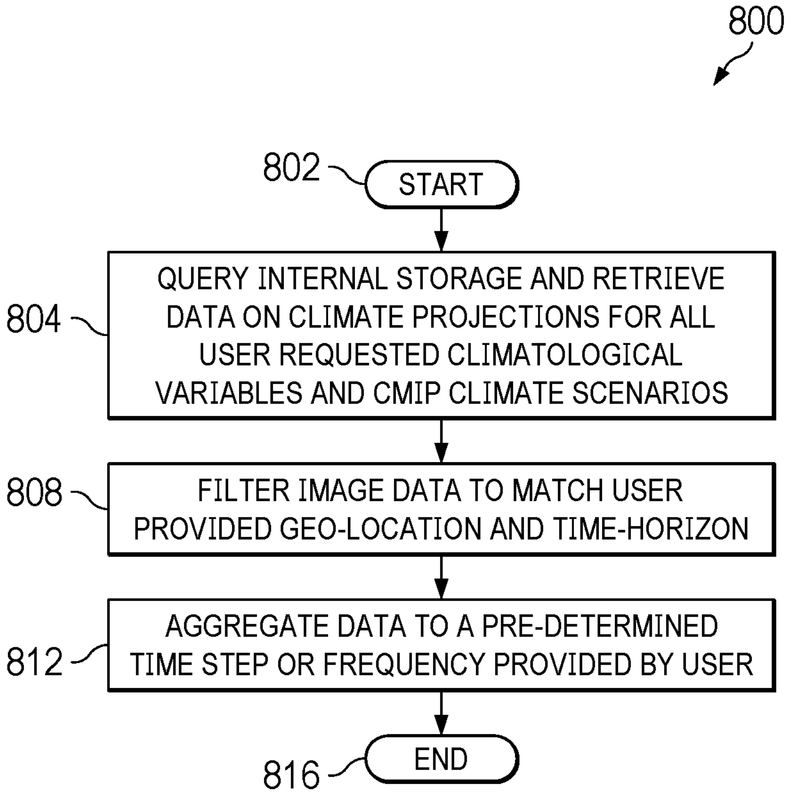
FIG. 8 depicts a flowchart of a process for pre-processing low-resolution climate projections in accordance with an illustrative embodiment.

With reference to FIG. 8, a flowchart of process 800 for processing low-resolution climate projections is depicted in accordance with an illustrative embodiment. Process 800 begins at step 802. The low-resolution climate projections are processed so that they can be enhanced to high-resolution climate projections using the trained model object. In this data processing workflow, data on climate projections such as, for example, provided by NEX GDDP, are retrieved from the internal storage (step 804). The data on climate projections has a low resolution (e.g., 25 km). The data is filtered to have correct attributes such as geo-extent, time-horizon and CMIP climate scenarios, as provided by the user (step 808). In some illustrative embodiments, the filtered data is aggregated to a predetermined time step based on user query (step 812). Process 800 then ends at step 816.

Figure 9:
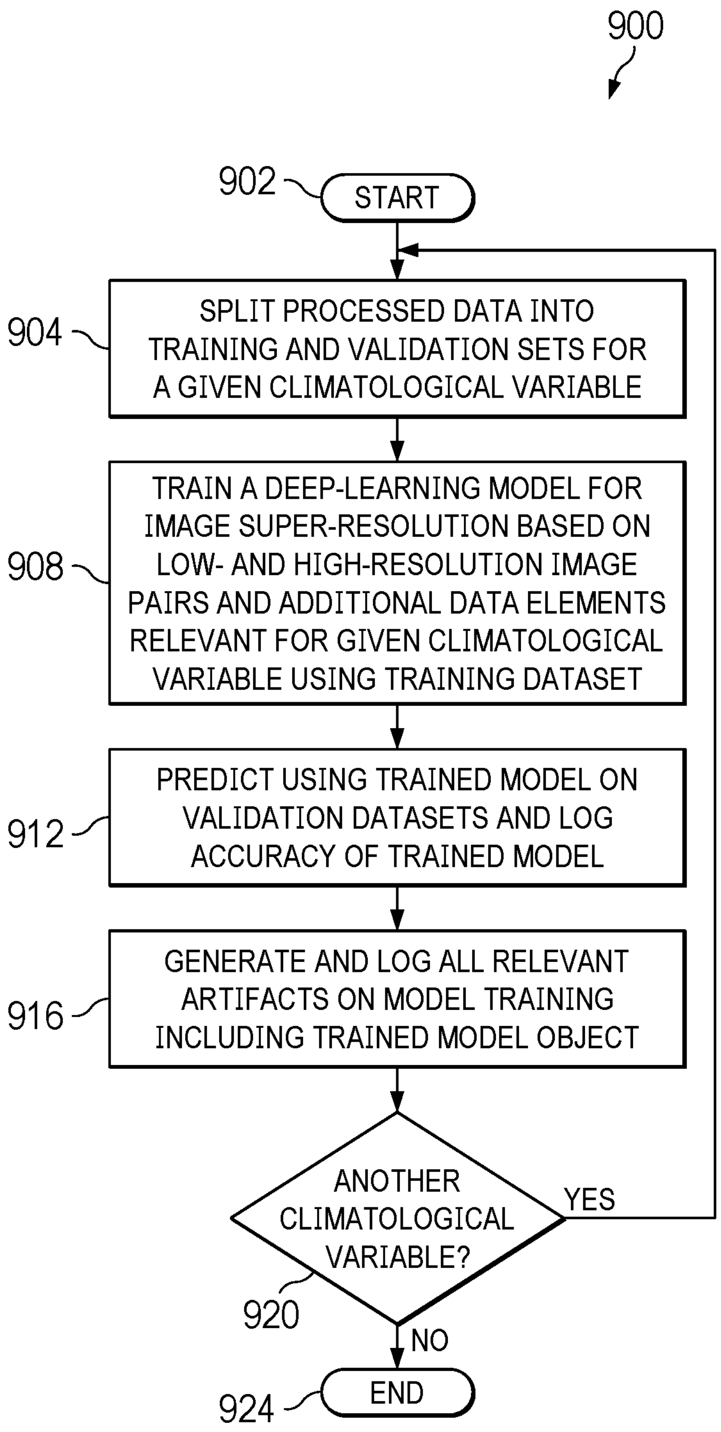
FIG. 9 depicts a flowchart of a process for on-demand model training in accordance with an illustrative embodiment.

With reference next to FIG. 9, a flowchart of process 900 for on-demand model training per climatological variables is depicted in accordance with an illustrative embodiment. Process 900 starts at step 902. A training set and a validation set are created from processed data from process 700 (step 904). The training set and the validation set each comprises pairs of low-resolution and high-resolution images.

Based on the training set, a deep-learning computer algorithm is trained to learn a trained model object which represents a mapping function from the low-resolution images to the high-resolution images for a given climatological variable (step 908). In some illustrative embodiments, this mapping function may incorporate learning from relevant additional observables, such as but not limited to elevation. These additional observables may be included as additional channels into the deep learning architecture. In some illustrative embodiments, the deep learning architecture may comprise convolutional neural networks (CNN) as building blocks, a type of neural network architecture suited for image data. In some illustrative embodiments, the architecture may utilize deep residual networks wherein blocks of CNN modules are repeated with residual learning implemented as shortcut connections. The architecture may also use generative approaches, such as generative adversarial networks and diffusion models. The mapping function is also referred to as the trained model object. The accuracy of the trained model is determined utilizing the validation set (step 912). The trained model object is applied to the validation set to produce high-resolution images. The accuracy of the trained model object is determined by comparing the high-resolution images generated by the trained model object to the high-resolution images in the validation set.

The trained model object along with relevant artifacts are saved in the internal storage (step 916). The above steps are repeated for each additional climatological variable (step 920). If there are no additional climatological variables, the process ends at step 924.

Figure 10:
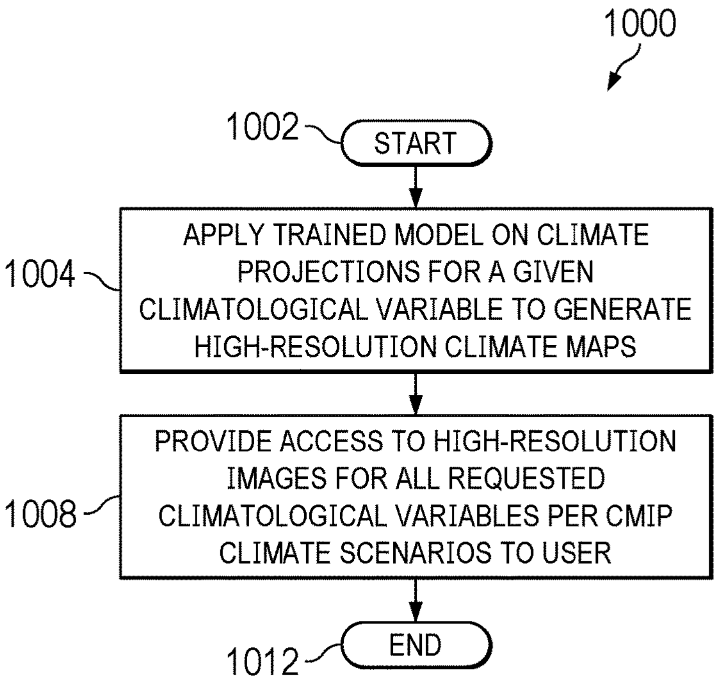
FIG. 10 depicts a flowchart of a process for application of a trained model object to enhance climate projections in accordance with an illustrative embodiment.

With reference to FIG. 10, a flowchart of process 1000 for application of the trained model object to enhance climate projections is depicted in accordance with an illustrative embodiment. Process starts at 1002. The trained model object produced in process 900 is applied on climate projections of the second spatial resolution (e.g., low resolution) to generate climate projections of the first spatial resolution (e.g., high resolution) (step 1004). The climate projections of the first spatial resolution for requested climatological variables are provided to users (step 1008). Process 1000 ends at 1012.

Figure 11:
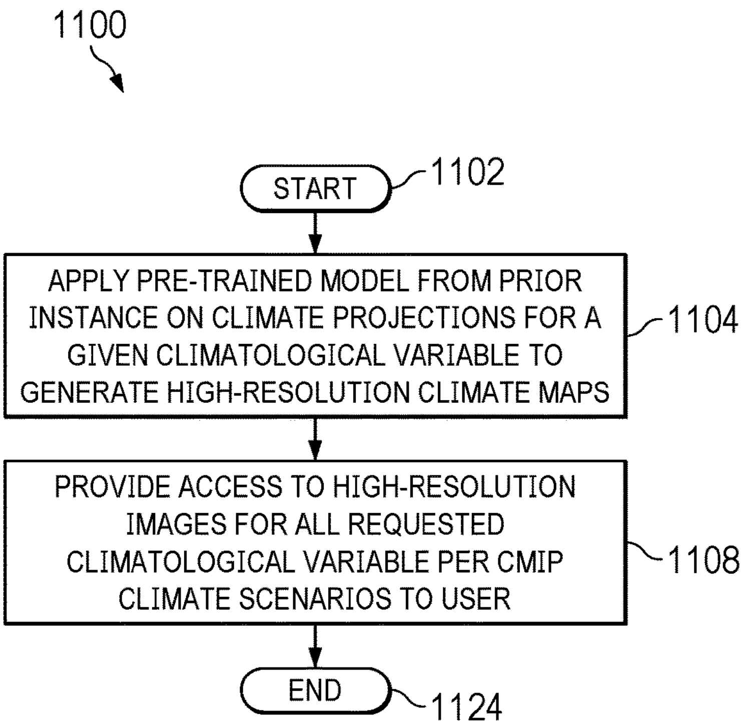
FIG. 11 depicts a flowchart of a process for using a pre-trained model object in accordance with an illustrative embodiment.

In some illustrative embodiments, based on user query, an on-demand model training may not be necessary if a pre-trained model object from process 900 may be used. In such scenarios, FIG. 11 shows process 1100 which starts at 1102, and a pre-trained model object from process 900 is used for generating the high-resolution climate projections (step 1104). The high-resolution climate projections are provided to users (step 1108). Process 1100 then ends at step 1124.

Figure 12A:
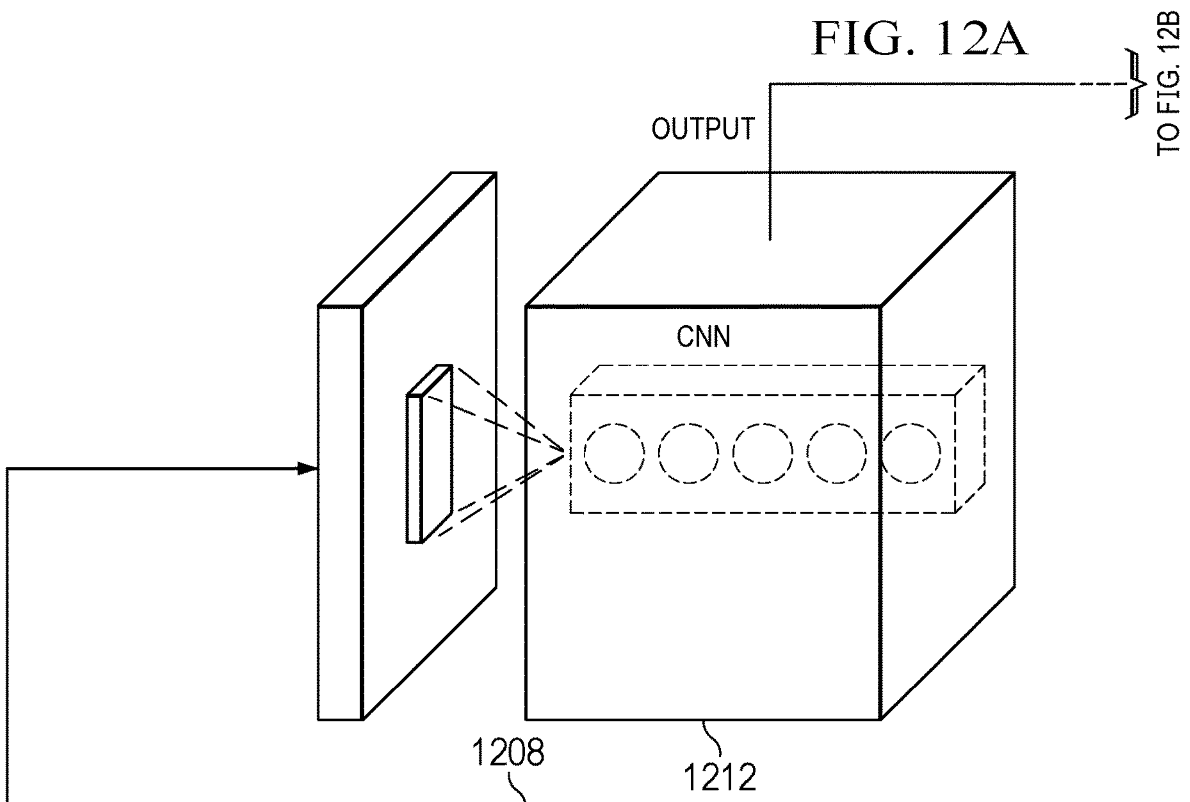
FIGS. 12A, 12B and 12C illustrate an example process of an application of a trained model object in accordance with illustrative embodiments.
Figure 12B:
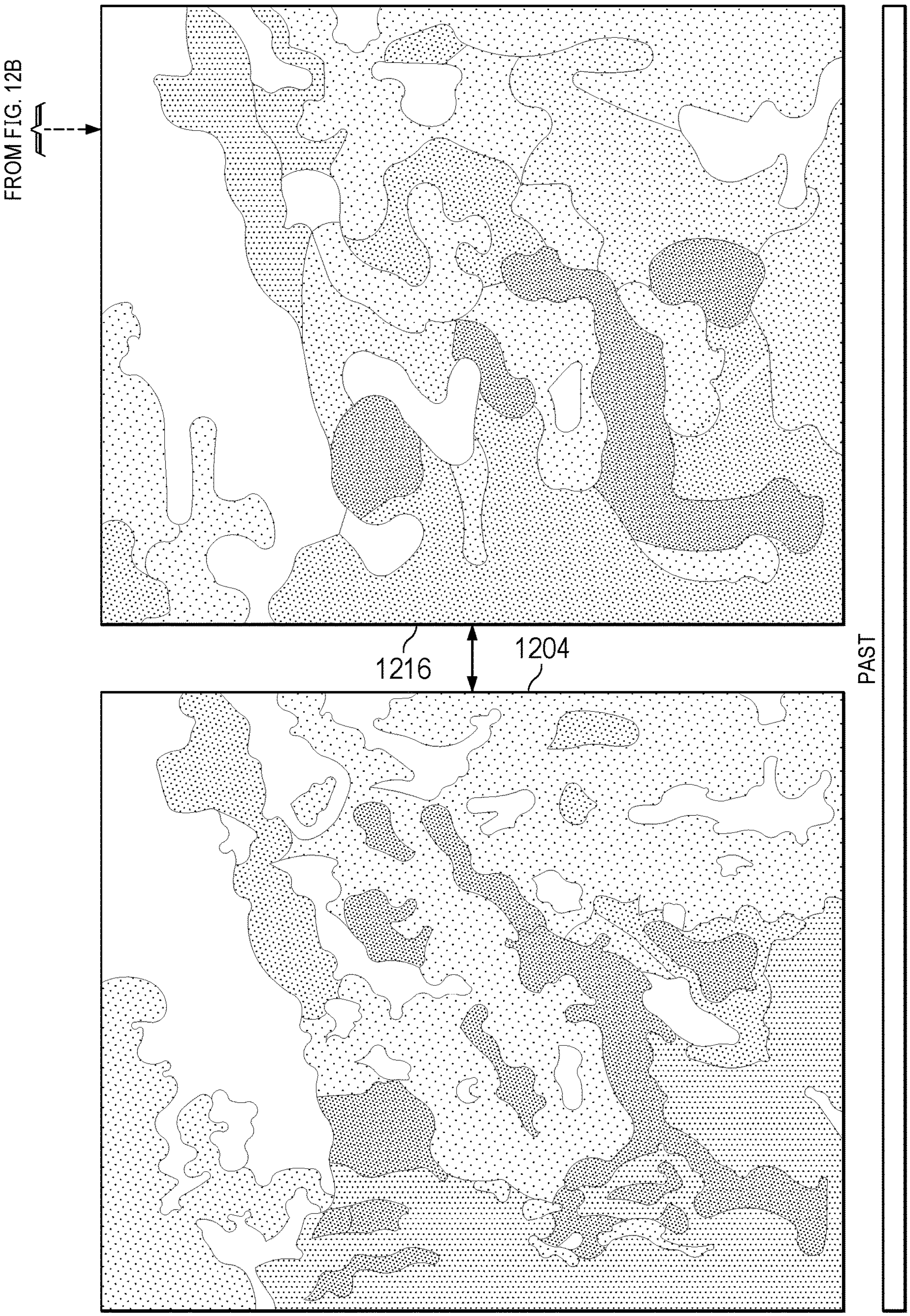
Figure 12C:

With reference next to FIGS. 12A, 12B and 12C, an example process of training a deep learning model on land surface temperature (LST) and the application of a trained model object to generate projections of surface temperature in accordance with illustrative embodiments is depicted.

In this example, LST images 1204 (illustrated in FIG. 12B) at a spatial resolution of 1 km are obtained. LST images 1204 are observed satellite images of land surface temperature in Northern California in January 2020. LST images 1204 are resampled and interpolated to generate input images 1208 (illustrated in FIG. 12A) at a spatial resolution of 25 km. Thus, low-resolution input images (e.g., input images 1208) are generated by resampling and interpolating high-resolution satellite images (e.g., LST images 1204). Next, pairs of training and validation sets of data are formed using the low-resolution input images and the high-resolution satellite images. Based on the training set, a deep-learning computer algorithm is trained to learn a mapping function from the low-resolution input images to the high-resolution satellite images. In this example, the deep-learning algorithm comprises convolutional neural networks (CNN) 1212 (illustrated in FIG. 12A). The mapping function is also referred to as a trained model object. The accuracy of the trained model object is determined by applying the trained model object to the validation set to produce high-resolution images 1216 (illustrated in FIG. 12B) at a spatial resolution of 1 km. High-resolution images 1216 are compared to LST images 1204 to determine the accuracy of the trained model object.

Next, the trained model object is applied to enhance climate projections of a low resolution to generate climate projections of a high resolution. In this illustrative example, the trained model object is applied to NEX GDDP projections 1220 (illustrated in FIG. 12C) which are projections to January 2050 at a spatial resolution of 25 km. NEX GDDP projections 1220 correspond to a specific GCM (GFDL-ESM-4) and CMIP climate scenario (SSP5-8.5). The trained model object is used to enhance the resolution of NEX GDDP projections 1220 to generate high-resolution NEX GDDP projections 1224 (illustrated in FIG. 12C) to January 2050 at a spatial resolution of 1 km. Thus, the trained model object is used to enhance the resolution of NEX GDDP projections 1220 from 25 km to 1 km, an enhancement of 25×. A similar process can be replicated for other climatological variables per CMIP climate scenarios and GCM model and across an entire time-horizon for which climate projections are available.

Figure 13:
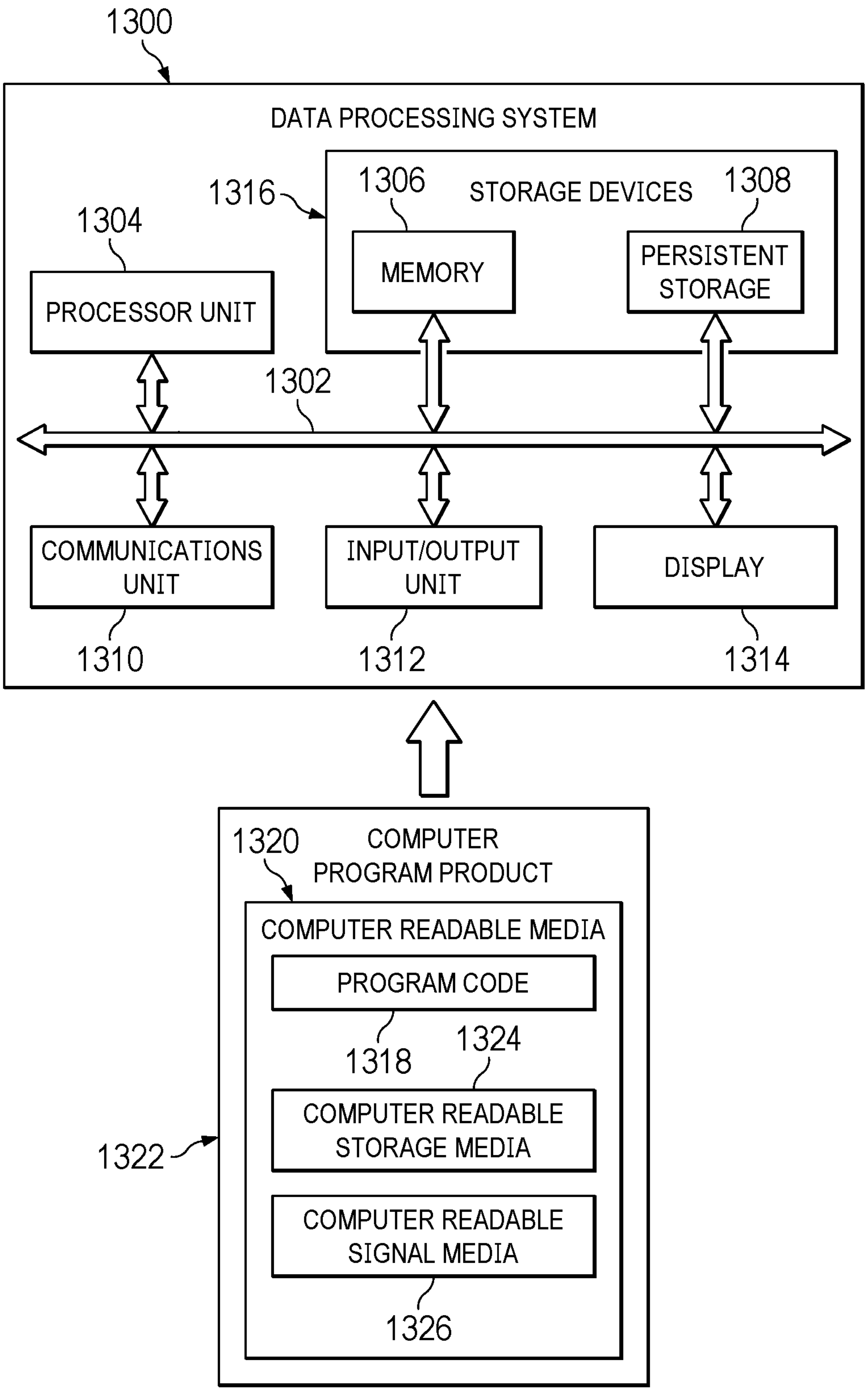
FIG. 13 illustrates a block diagram of a data processing system in accordance with an illustrative embodiment.

Turning now to FIG. 13, an illustration of a block diagram of a data processing system is depicted in accordance with an illustrative embodiment. Data processing system 1300 may be used to implement server computers 104 and 106 and client devices 110 in FIG. 1, as well as computer system 200 in FIG. 2. In this illustrative example, data processing system 1300 includes communications framework 1302, which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation. In an embodiment, processor unit 1304 comprises one or more conventional general-purpose central processing units (CPUs). In an alternate embodiment, processor unit 1304 comprises one or more graphical processing units (GPUS).

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308. Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer-usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318. Computer readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1318 may be transferred to data processing system 1300 using computer readable signal media 1326. Computer readable signal media 1326 may be, for example, a propagated data signal containing program code 1318. For example, computer readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1100. Other components shown in FIG. 13 can be varied from the illustrative examples shown. The different embodiments may be implemented using any hardware device or system capable of running program code 1318.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for dynamic generation of climate projections, the method comprising:

receiving past climate data of a first spatial resolution, wherein the past climate data comprises a plurality of climatological variables;

converting the past climate data of the first spatial resolution to past climate data of a second spatial resolution;

allocating a first subset of the past climate data of the first spatial resolution and corresponding past climate data of the second spatial resolution to a training set of pairs of the past climate data of the first and second spatial resolutions;

allocating a second subset of remaining pairs of past climate data of the first spatial resolution and the corresponding past climate data of the second spatial resolution to a validation set;

training a machine learning model with a deep learning algorithm with the training set to generate a trained model object that maps a relationship between the past climate data of the first spatial resolution and the past climate data of the second spatial resolution;

validating the trained model object with the validation set;

receiving climate projections of the second spatial resolution; and applying the trained model object to the climate projections of the second spatial resolution to generate climate projections of the first spatial resolution.

2. The method of claim 1, wherein the first spatial resolution is higher than the second spatial resolution.

3. The method of claim 1, wherein the past climate data comprises satellite acquired images.

4. The method of claim 1, further comprising pre-processing the past climate data of the first spatial resolution and the past climate data of the second spatial resolution prior to training the machine learning model.

5. The method of claim 4, wherein the pre-processing comprises at least one of normalizing, augmenting, or enhancing the past climate data of the first and second spatial resolutions prior to training the machine learning model.

6. The method of claim 1, wherein conversion of the past climate data of the first spatial resolution to the past climate data of the second spatial resolution comprises interpolating and resampling the past climate data of the first spatial resolution.

7. The method of claim 1, wherein the deep learning algorithm comprises a convolutional neural network (CNN) or a generative adversarial network (GAN).

8. The method of claim 1, wherein validating the trained model object comprises:

generating a set of past climate data of the first spatial resolution by applying the trained model object to the past climate data of the second spatial resolution from the validation set; and comparing the generated set of past climate data of the first spatial resolution to the past climate data of the first spatial resolution in the validation set.

9. A system for dynamic generation climate projections, the system comprising:

a storage device configured to store program instructions; and one or more processors operably connected to the storage device and configured to execute the program instructions to cause the system to:

receive past climate data of a first spatial resolution, wherein the past climate data comprises a plurality of climatological variables;

convert the past climate data of the first spatial resolution to past climate data of a second spatial resolution;

allocate a first subset of the past climate data of the first spatial resolution and corresponding past climate data of the second spatial resolution to a training set of pairs of the past climate data of the first and second spatial resolutions;

allocate a second subset of remaining past climate data of the first spatial resolution and corresponding past climate data of the second spatial resolution to a validation set of pairs of the past climate data of the first and second spatial resolutions;

train a machine learning model with a deep learning algorithm with the training set of pairs of the past climate data of the first and second spatial resolutions to generate a trained model object that maps a relationship between the past climate data of the first spatial resolution and the past climate data of the second spatial resolution;

validate the trained model with the validation set of pairs of the past climate data of the first and second spatial resolutions; and receive the climate projections of the second spatial resolution; and apply the trained model object to the climate projections of the second spatial resolution to generate the climate projections of the first spatial resolution.

10. The system of claim 9, wherein the first spatial resolution is higher than the second spatial resolution.

11. The system of claim 9, wherein the past climate data comprises satellite acquired images.

12. The system of claim 9, wherein the processors further execute instructions to pre-process the past climate data of the first spatial resolution and the past climate data of the second spatial resolution prior to training the machine learning model.

13. The system of claim 12, wherein the pre-processing comprises at least one of normalizing, augmenting, or enhancing the past climate data of the first and second spatial resolutions prior to training the machine learning model.

14. The system of claim 9, wherein the processors further execute instructions to convert the past climate data of the first spatial resolution to the past climate data of the second spatial resolution by interpolating and resampling the past climate data of the first spatial resolution.

15. The system of claim 9, wherein the deep learning algorithm comprises a convolutional neural network (CNN) or a generative adversarial network (GAN).

16. A computer program product for dynamic generation climate projections, the computer program product comprising:

a computer readable storage medium having program instructions embodied thereon to perform the steps of:

receiving past climate data of a first spatial resolution comprising a plurality of climatological variables;

converting the past climate data of the first spatial resolution to past climate data of a second spatial resolution;

allocating a first subset of the past climate data of the first spatial resolution and corresponding past climate data of the second spatial resolution to a training set of pairs of the past climate data of the first and second spatial resolutions;

allocating a second subset of remaining pairs of past climate data of the first spatial resolution and the corresponding past climate data of the second spatial resolution to a validation set;

training a machine learning model with a deep learning algorithm with the training set of pairs of the past climate data of the first and second spatial resolutions to generate a trained model object that maps a relationship between the past climate data of the first spatial resolution and the past climate data of the second spatial resolution;

validating the trained model object using the validation set of pairs of the past climate data of the first and second spatial resolutions;

receiving climate projections of the second spatial resolution; and applying the trained model object to the climate projections of the second spatial resolution to generate climate projections of the first spatial resolution.

17. The computer program product of claim 16, wherein the first spatial resolution is higher than the second spatial resolution.

18. The computer program product of claim 16, wherein the past climate data comprises satellite acquired images.

19. The computer program product of claim 16, further comprising instructions for pre-processing the past climate data of the first spatial resolution and the past climate data of the second spatial resolution prior to training the machine learning model.

20. The computer program product of claim 16, further comprising instructions for conversion of the past climate data of the first spatial resolution to the past climate data of the second spatial resolution by interpolating and resampling of the past climate data of the first spatial resolution.

21. The computer program product of claim 16, further comprising instructions for training the machine learning model using a convolutional neural network (CNN) or a generative adversarial network (GAN).

* * * * *